(12) United States Patent
Cheng et al.

(10) Patent No.: US 12,277,227 B2
(45) Date of Patent: Apr. 15, 2025

(54) BIOS MODULE PROVISIONING SEQUENCE VERIFICATION SYSTEM

(71) Applicant: Dell Products L.P., Round Rock, TX (US)

(72) Inventors: Po-Yu Cheng, Tainan (TW); Wei Liu, Austin, TX (US); Yu Hsuan Yang, Taoyuan (TW); Yu Cheng Sheng, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 18/296,720

(22) Filed: Apr. 6, 2023

(65) Prior Publication Data
US 2024/0338452 A1 Oct. 10, 2024

(51) Int. Cl.
G06F 21/57 (2013.01)
G06F 21/60 (2013.01)

(52) U.S. Cl.
CPC .......... G06F 21/572 (2013.01); G06F 21/602 (2013.01)

(58) Field of Classification Search
CPC ................................................. G06F 21/572
See application file for complete search history.

(56) References Cited

U.S. PATENT DOCUMENTS

| | | | |
|---|---|---|---|
| 2012/0023318 A1* | 1/2012 | Xing | G06F 9/4403 711/E12.001 |
| 2020/0257521 A1* | 8/2020 | Jayakumar | G06F 21/572 |
| 2020/0272738 A1* | 8/2020 | Shroff | G06F 11/1417 |
| 2021/0096838 A1* | 4/2021 | Samuel | G06F 21/572 |
| 2022/0100849 A1* | 3/2022 | Vandergeest | G06F 21/55 |
| 2024/0345924 A1* | 10/2024 | Kotary | G06F 21/554 |

FOREIGN PATENT DOCUMENTS

CN 105302371 A 2/2016

* cited by examiner

*Primary Examiner* — Simon P Kanaan
(74) *Attorney, Agent, or Firm* — Joseph Mencher

(57) ABSTRACT

A BIOS module provisioning sequence verification system includes a BIOS subsystem coupled to a TPM and a BIOS storage system including a plurality of firmware volumes. The BIOS subsystem provides a plurality of BIOS modules in a BIOS module provisioning sequence using the plurality of firmware volumes and, for each of the plurality of BIOS modules when that BIOS module is provided during the BIOS module provisioning sequence: retrieves a BIOS module identifier associated with that BIOS module, and updates BIOS module provisioning sequence information using that BIOS module identifier. Following the provisioning of the BIOS modules in the BIOS module provisioning sequence, the BIOS subsystem provides the BIOS module provisioning sequence information to the TPM, with the BIOS module provisioning sequence information configured to be compared to BIOS module provisioning sequence verification information to verify the BIOS module provisioning sequence.

20 Claims, 11 Drawing Sheets

BIOS MODULE PROVISIONING SEQUENCE VERIFICATION SYSTEM

BACKGROUND

The present disclosure relates generally to information handling systems, and more particularly to verifying a provisioning sequence of Basic Input/Output System (BIOS) modules in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, utilize a Basic Input/Output System (BIOS) to perform hardware initialization during an initialization/boot process (e.g., Power-On Self-Test (POST)) for the computing device, runtime services for operating systems and/or applications running on the computing device, and/or other BIOS operations known in the art. In order to ensure that the initialization/boot process is secure, conventional BIOS systems may verify the firmware volumes that are stored in the BIOS Serial Peripheral Interface (SPI) Read-Only Memory (ROM) and that are used during the initialization/boot process by performing a hash operation on the data included in those firmware volumes to generate a hash value, and providing that hash value in a Platform Configuration Register (PCR) in a Trusted Platform Module (TPM) (e.g., by "extending" a value in the PCR using techniques known in the art) so that it may be checked against a known/"golden" value (e.g., by an Operating System loading component) to determine whether the two match (in which case the firmware volumes are verified) or not (in which case the firmware volumes may have been corrupted, compromised, or are otherwise unsecure).

However, even when the integrity of the firmware volumes is verified in conventional BIOS systems as discussed above, the use of those firmware volumes during the initialization/boot process can raise issues. For example, the firmware volumes include/provide BIOS drivers and/or other BIOS modules that are dispatched, loaded, and/or otherwise provided in the computing device during the initialization/boot process, and the sequence in which the BIOS modules are provisioned can affect the security of the initialization/boot process and/or the otherwise effect the functionality of the computing device. To provide some specific examples, system configurations (e.g., whether a password jumper is enabled that will load BIOS modules depending on whether a password has been received and authenticated) and/or error conditions (e.g., a KTI failure) can prevent BIOS modules from being provided and/or change the sequence in which they are provided.

As will be appreciated by one of skill in the art in possession of the present disclosure, the failure to provide BIOS modules, or modifications of the sequence of BIOS module provisioning, can prevent security operations from being performed (or being performed at a desired time) due to a BIOS module that performs those security operations not being provided, prevent services from being available due to a BIOS module that performs those services not being provided, and/or result in other issues known in the art. However, because of the number of firmware volumes and BIOS modules used during the initialization/boot process for computing devices (e.g., firmware volumes can provide hundreds of BIOS modules), verification of each BIOS module via the provisioning of a respective hash value for each BIOS module in the PCR of the TPM similarly as described for the firmware volumes as discussed above would be time consuming and would negatively affect the time needed to complete the initialization/boot process.

Accordingly, it would be desirable to provide a BIOS module provisioning sequence verification system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: provide a plurality of BIOS modules in a BIOS module provisioning sequence using a plurality of firmware volumes included in a BIOS storage system and, for each of the plurality of BIOS modules when that BIOS module is provided during the BIOS module provisioning sequence: retrieve a BIOS module identifier associated with that BIOS module; and update BIOS module provisioning sequence information using that BIOS module identifier; and provide, following the provisioning of the BIOS modules in the BIOS module provisioning sequence, the BIOS module provisioning sequence information to a Trusted Platform Module (TPM), wherein the BIOS module provisioning sequence information is configured to be compared to BIOS module provisioning sequence verification information to verify the BIOS module provisioning sequence.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
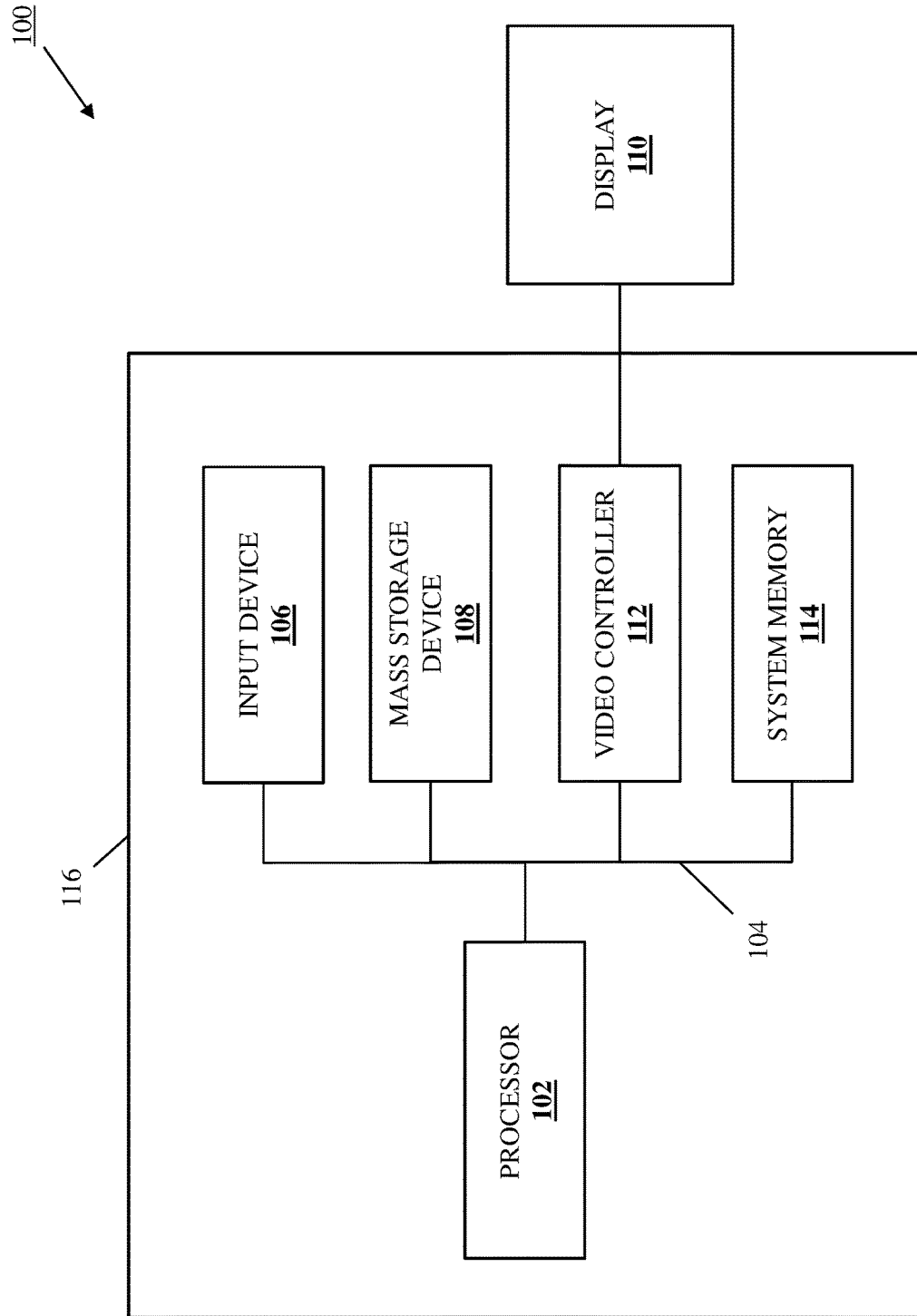
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
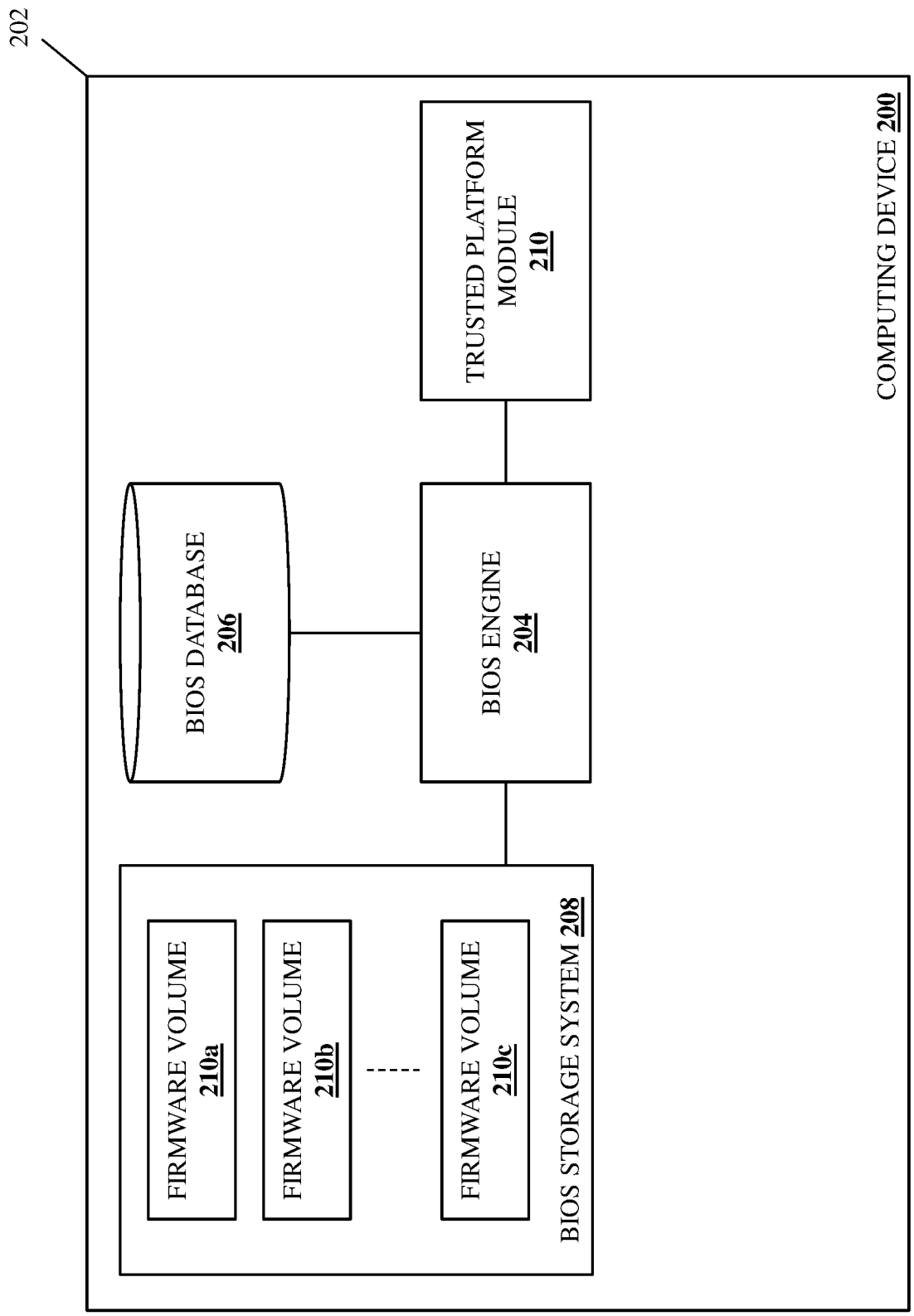
FIG. 2 is a schematic view illustrating an embodiment of a computing device that may include the BIOS module provisioning sequence verification system of the present disclosure.

Referring now to FIG. 2, an embodiment of a computing device 200 is illustrated that may include the BIOS module provisioning sequence verification system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or other computing devices known in the art. However, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Basic Input/Output System (BIOS) engine 204 that is configured to perform the functionality of the BIOS engines, BIOS subsystems, and/or computing devices discussed below. In specific examples provided below, the BIOS engine 204 is configured to provide a Pre-Extensible Firmware Interface (EFI) Initialization (PEI) dispatcher, a Driver eXecution Environment (DXE) dispatcher, other state machines, and other BIOS components that would be apparent to one of skill in the art in possession of the present disclosure.

As illustrated, a BIOS database 206 may be coupled to the BIOS engine 204 and may be configured to store any of the information utilized by the BIOS engine 204 as discussed below. In a specific example, the BIOS engine 204 and BIOS database 206 may be provided by BIOS firmware and/or other BIOS processing/memory/storage combinations that would be apparent to one of skill in the art in possession of the present disclosure. Furthermore, while described as a "BIOS", one of skill in the art in possession of the present disclosure will appreciate how the BIOS functionality described herein may be provided by a Unified Extensible Firmware Interface (UEFI) system that one of skill in the art will recognize may replace the conventional BIOS and may be provided by specifications defining the architecture of platform firmware used for booting and interfaces utilized to interact with an operating system in the computing device 200.

The chassis 202 may also house a BIOS storage system 208 that is coupled to the BIOS engine 204 (e.g., via a coupling between the BIOS storage system 208 and the processing system) and that may be provided by a BIOS Serial Peripheral Interface (SPI) Read-Only Memory (ROM) and/or other BIOS storage systems that would be apparent to one of skill in the art in possession of the present disclosure. In the illustrated embodiment, the BIOS storage system 208 is illustrated as storing firmware volumes 210a, 210b, and up to 210c, each of which may be utilized to provide BIOS drivers and/or other BIOS modules as discussed in further detail below. The chassis 202 may also house a Trusted Platform Module (TPM) 210 that is coupled to the BIOS engine 204 (e.g., via a coupling between the TPM 210 and the processing system) and that may include a dedicated microcontroller (e.g., a secure crypto processor) that is configured to secure hardware in the computing device 200 using integrated cryptographic keys, a chip conforming to the TPM standard, and/or other TPM components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BIOS module provisioning sequence verification functionality discussed below, while remaining within the scope of the present disclosure as well.

Figure 3:
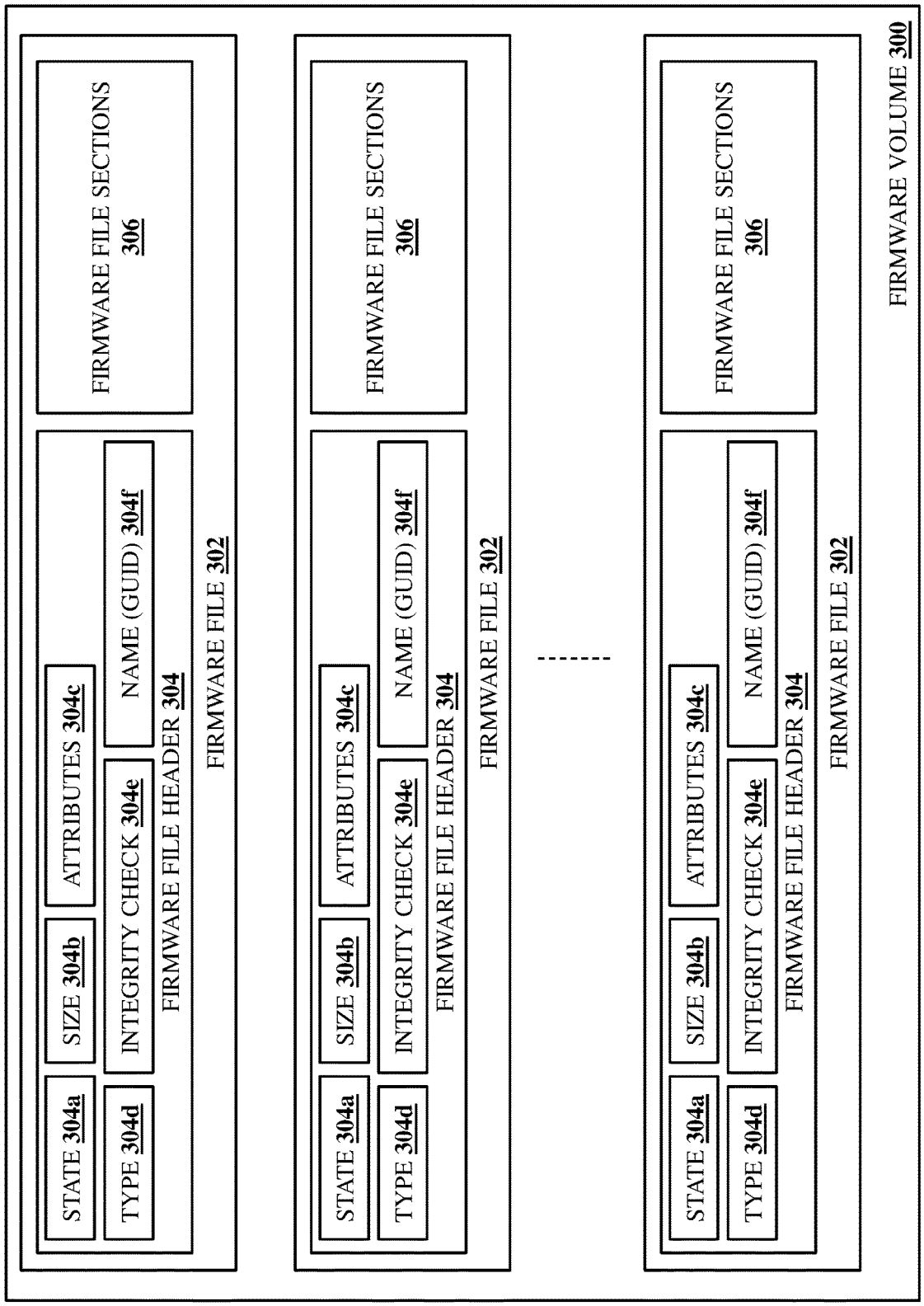
FIG. 3 is a schematic view illustrating an embodiment of a firmware volume that may be included in the computing device of FIG. 2.

Referring now to FIG. 3, an embodiment of a firmware volume 300 is illustrated that may provide any of the firmware volumes 210a, 210b, and up to 210c discussed above with reference to FIG. 2. In the illustrated embodiment, the firmware volume 300 includes a plurality of firmware files 302, with each firmware file including a firmware file header 304 and a plurality of firmware file sections 306. As illustrated, the firmware file header 304 in each firmware file 302 identifies a state 304a of the firmware file, a size 304b of the firmware file, a plurality of attributes 304c of the firmware file, a type 304d of the firmware file, integrity check information 304e for the firmware file, and a name 304f of the firmware file that is provided by a Globally Unique IDentifier (GUID) in the illustrated embodiment. As will be appreciated by one of skill in the art in possession of the present disclosure and as discussed in further detail below, each firmware file 302 in each firmware volume 210a-210c/300 may be configured to provide a respective BIOS driver (e.g., a Pre-Extensible Firmware Interface (EFI) Initialization Module (PEIM) driver or a Driver eXecution Environment (DXE) driver in the specific examples provided below) or other BIOS module known in the art, with the GUID that provides the name 304f in the firmware file header 304 of that firmware file 302 being associated with that BIOS module. However, while a specific example of a firmware volume has been illustrated and described, one of skill in the art in possession of the present disclosure will appreciate how a variety of firmware volumes will fall within the scope of the present disclosure as well.

Figure 4:
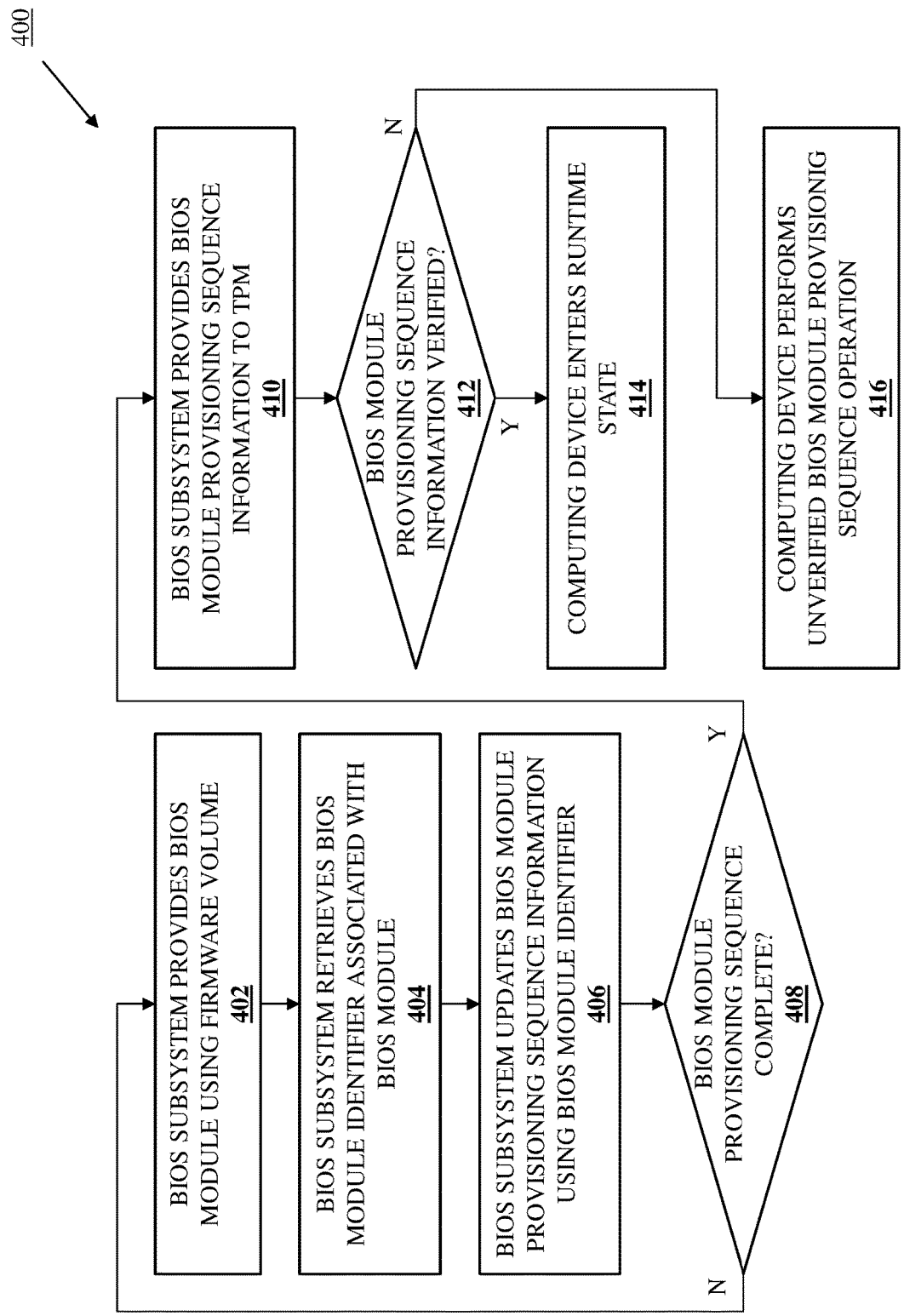
FIG. 4 is a flow chart illustrating an embodiment of a method for verifying a provisioning sequence of BIOS modules.

Referring now to FIG. 4, an embodiment of a method 400 for verifying a provisioning sequence of Basic Input/Output System (BIOS) modules is illustrated. As discussed below, the systems and methods of the present disclosure provide for the updating of BIOS module provisioning sequence information that identifies a sequence in which BIOS modules are provided and, upon completion of the provisioning of the BIOS modules, the comparison of the BIOS module provisioning sequence information to BIOS module provisioning sequence verification information. For example, the BIOS module provisioning sequence verification system of the present disclosure may include a BIOS subsystem coupled to a TPM and a BIOS storage system including a plurality of firmware volumes. The BIOS subsystem provides a plurality of BIOS modules in a BIOS module provisioning sequence using the plurality of firmware volumes and, for each of the plurality of BIOS modules when that BIOS module is provided during the BIOS module provisioning sequence: retrieves a BIOS module identifier associated with that BIOS module, and updates BIOS module provisioning sequence information using that BIOS module identifier. Following the provisioning of the BIOS modules in the BIOS module provisioning sequence, the BIOS subsystem provides the BIOS module provisioning sequence information to the TPM, with the BIOS module provisioning sequence information configured to be compared to BIOS module provisioning sequence verification information to verify the BIOS module provisioning sequence. As will be appreciated by one of skill in the art in possession of the present disclosure, the systems and methods described herein provide efficient and secure techniques to verify whether BIOS modules were provided in a known/secure sequence with a negligible impact to the time needed to complete the initialization/boot process for computing devices.

In an embodiment, during or prior to the method 400, conventional firmware volume verification operations like those discussed above may be performed in order to allow for the verification of the firmware volumes 210a-210c stored in the BIOS storage system 208. For example, as described above, the BIOS engine 204 may perform a hash operation on the data included in the firmware volumes 210a-210c to generate a firmware volume hash value, and may provide that hash value in a PCR (e.g., PCR0) in the TPM 210 (e.g., by "extending" a value in that PCR of the TPM 210 using techniques that would be apparent to one of skill in the art in possession of the present disclosure). Subsequently (e.g., during preparations to begin runtime operations for the computing device 200 by an operating system loading component or other runtime operation preparation component known in the art), the firmware volume hash value (e.g., as incorporated into the "extended" value in the PCR of the TPM 210 as discussed above) may be checked against a known/"golden" value to determine whether the two match (in which case the firmware volumes 210a-210c are verified) or not (in which case the firmware volumes 210a-210c may have been corrupted, compromised, or are otherwise unsecure).

The method 400 begins at block 402 where a BIOS subsystem provides a BIOS module using a firmware volume. As described below and as will be appreciate by one of skill in the art in possession of the present disclosure, BIOS modules such as, for example, the PEIM drivers and/or DXE drivers described above, may be provided during an initialization/boot process for the computing device 200. For example, the PEI dispatcher or DXE dispatcher provided by the BIOS engine 204 as discussed above may operate as a state machine to evaluate dependency expressions in the PEIM drivers, DXE drivers, and/or other BIOS modules provided by the firmware volumes 210a-210c in order to determine when to dispatch, load, and/or otherwise provide the PEIM drivers, DXE drivers, and/or other BIOS modules in the BIOS module provisioning sequence described below. As such, one of skill in the art in possession of the present disclosure will appreciate how blocks 402, 404, 406 and 408 of the method 400 may loop to dispatch, load, and/or otherwise provide BIOS modules in a BIOS module provisioning sequence starting with the provisioning of the initial BIOS module described immediately below, and followed by provisioning of subsequent BIOS modules during subsequent iterations of the method 400, based on their dependencies until provisioning of the BIOS modules is completed.

Figure 5A:
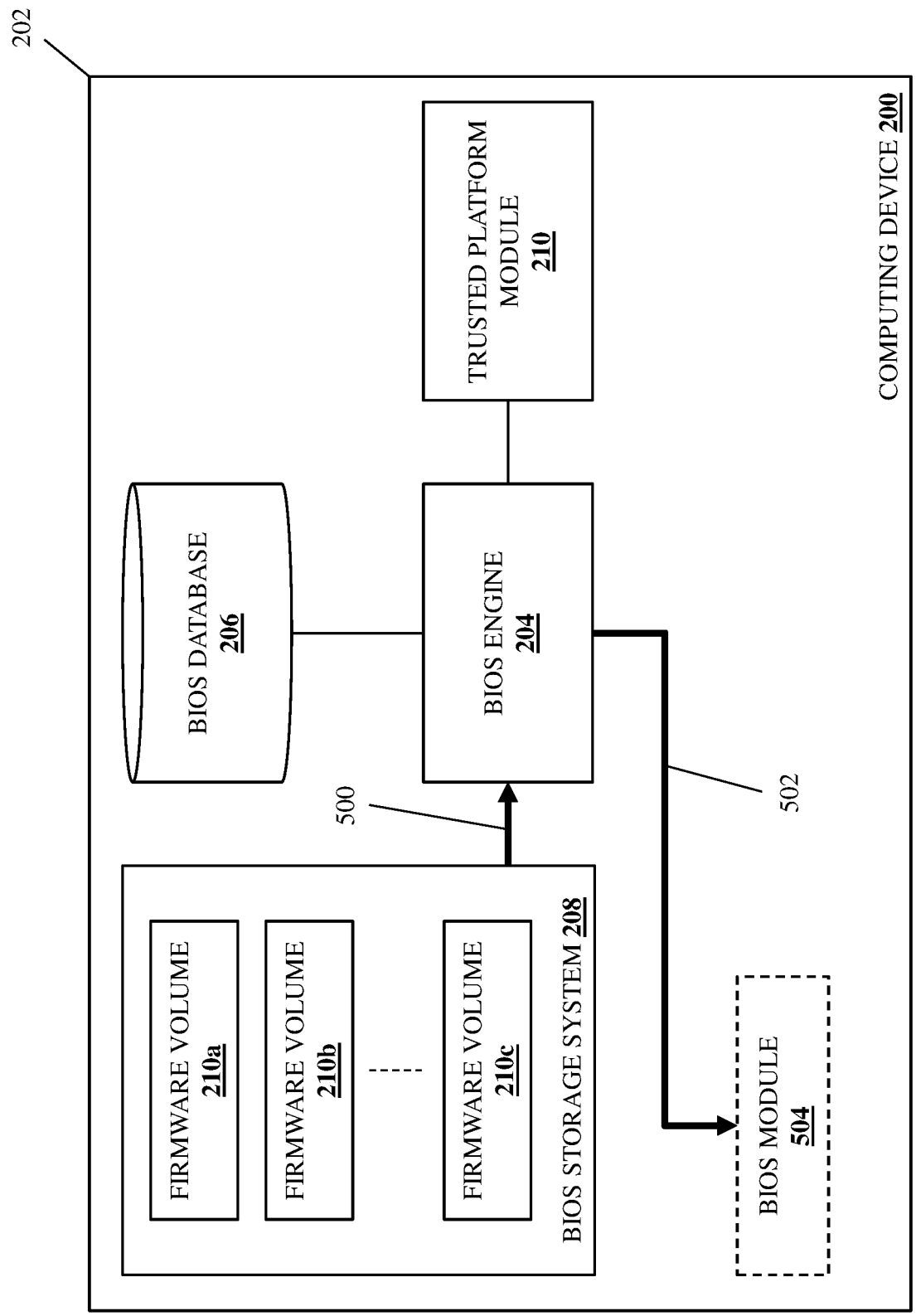
FIG. 5A is a schematic view illustrating an embodiment of the operation of the computing device of FIG. 2 during the method of FIG. 4.

Thus, with reference to FIG. 5A and in an embodiment of block 402 that may be performed during a first iteration of the method 400, the BIOS engine 204 in the computing device may perform BIOS module retrieval operations 500 that may include retrieving firmware file sections 306 from a firmware file 302 in one of the firmware volumes 210a-210c/300 that provides the BIOS module that was identified for provisioning (e.g., based on the dependency expressions in the PEIM drivers, DXE drivers, and/or other BIOS modules provided by the firmware volumes 210a-210c as discussed above). The BIOS engine 204 may then perform BIOS module provisioning operations 502 that may include using those retrieved firmware file sections 306 to provide a BIOS module 504 using BIOS module provisioning techniques known in the art.

Figure 5B:
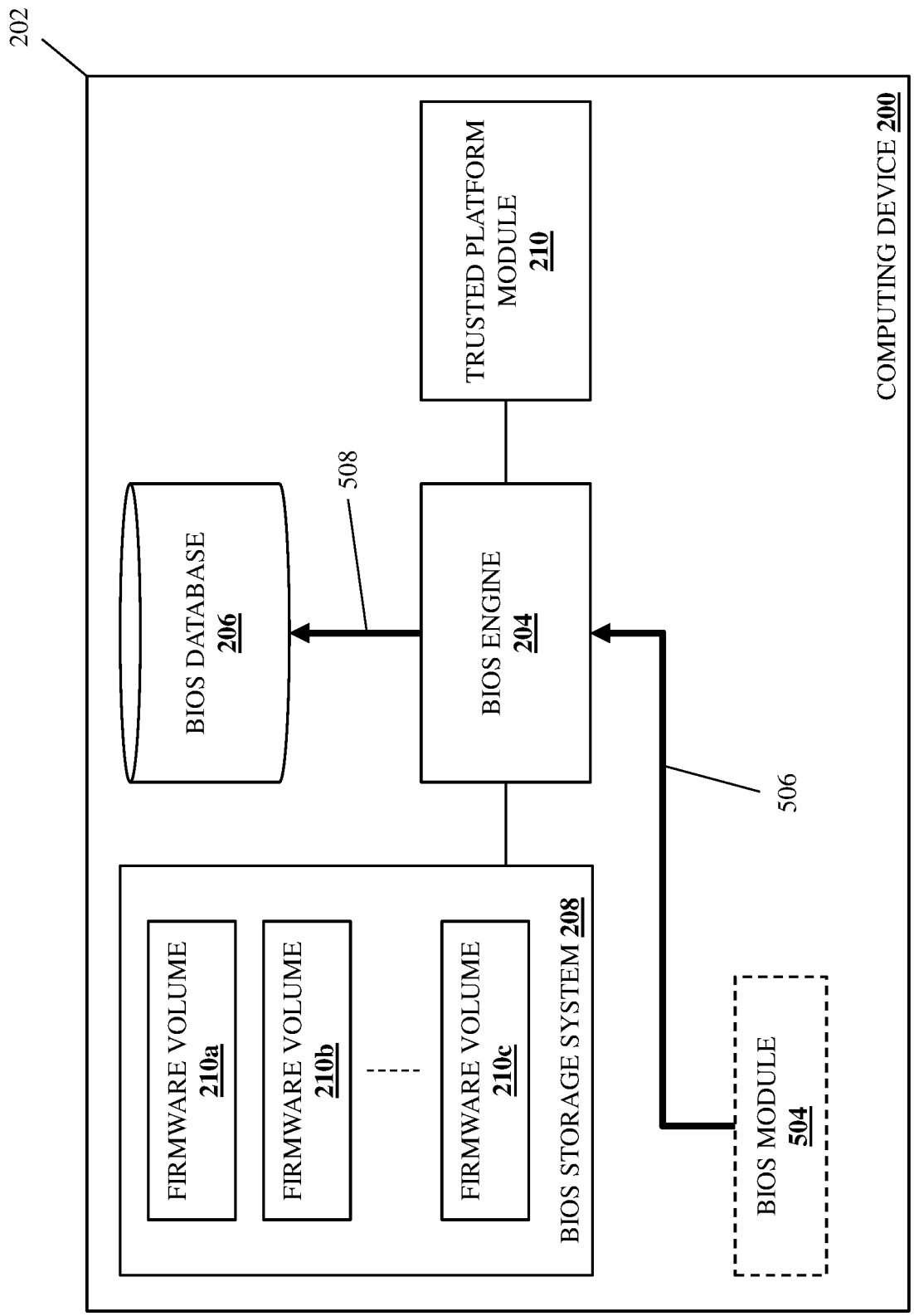
FIG. 5B is a schematic view illustrating an embodiment of the operation of the computing device of FIG. 2 during the method of FIG. 4.

The first iteration of the method 400 then proceeds to block 404 where the BIOS subsystem retrieves a BIOS module identifier associated with the BIOS module that was provided at block 402. With reference to FIG. 5B, in an embodiment of block 404, the BIOS engine 204 in the computing device 200 may perform BIOS module identifier retrieval operations 506 that may include retrieving the GUID that provides the name 304f in the firmware file header 304 of the firmware file 302 in the firmware volume that was used to provide the BIOS module 504 at block 402. Furthermore, while illustrated and discussed as being retrieved from the BIOS module 504, one of skill in the art in possession of the present disclosure will appreciate how the GUID associated with the BIOS module 504 (i.e., the GUID that provides the name 304f in the firmware file header 304 of the firmware file 302 that was used to provide the BIOS module 504) may be retrieved along with the firmware file sections 306 that are used to provide the BIOS module 504 at the same time from that firmware file 302 (e.g., as part of the BIOS module retrieval operations 500) while remaining within the scope of the present disclosure as well.

The first iteration of the method 400 then proceeds to block 406 where the BIOS subsystem updates BIOS module provisioning sequence information using the BIOS module identifier. With continued reference to FIG. 5B, in an embodiment of block 406, the BIOS engine 204 in the computing device 200 may perform BIOS module provisioning sequence information update operations 508 that include updating BIOS module provisioning sequence information in the BIOS database 206. Furthermore, as will be appreciated by one of skill in the art in possession of the present disclosure, in this initial iteration of the method 400, the "updating" of the BIOS module provisioning sequence information may be provided by an initial generation of BIOS module provisioning sequence information. For example, at block 406, the BIOS engine 204 may perform a hash operation on the BIOS module identifier (e.g., the GUID retrieved at block 404 during this first iteration of the method 400) to generate a hash result, and may then store that hash result in the BIOS database 206. However, while specific examples of the generation/updating of the BIOS module provisioning sequence information of the present disclosure are described herein, one of skill in the art in possession of the present disclosure will appreciate how BIOS module provisioning sequence information of the present disclosure may be provided in other manners that will fall within the scope of the present disclosure as well.

The first iteration of the method 400 then proceeds to decision block 406 where it is determined whether the BIOS module provisioning sequence is complete. As discussed above, a BIOS module provisioning sequence provides for the dispatching, loading, and/or other provisioning of each of the BIOS modules that are needed for the initialization/boot process for the computing device 200. As such, in an embodiment of decision block 406, the BIOS engine 204 in the computing device 200 may determine whether all of the BIOS modules that are needed for the initialization/boot process for the computing device 200 have been provided such that the BIOS module provisioning sequence has completed.

Figure 6A:
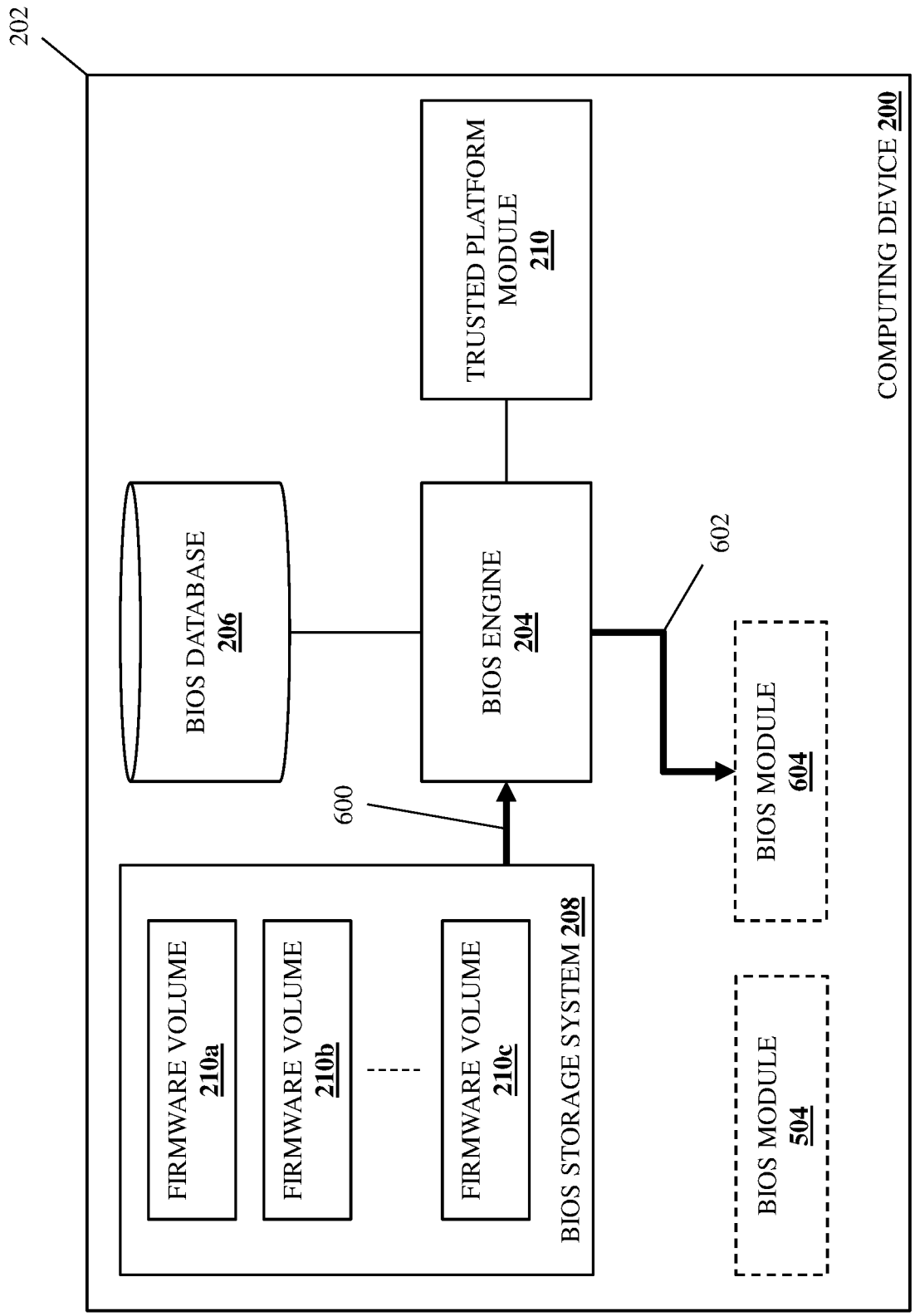
FIG. 6A is a schematic view illustrating an embodiment of the operation of the computing device of FIG. 2 during the method of FIG. 4.

If, at decision block 406, it is determined that the BIOS module provisioning sequence is not complete, the method 400 returns to block 402. As such, the method 400 may loop such that BIOS modules are provided using respective firmware volumes, and their associated BIOS module identifiers are retrieved and used to update the BIOS module provisioning sequence information until the BIOS module provisioning sequence is complete. For example, with reference to FIG. 6A and in an embodiment of block 402 that may be performed during an second iteration of the method 400, the BIOS engine 204 in the computing device may perform BIOS module retrieval operations 600 that may include retrieving firmware file sections 306 from a firmware file 302 in one of the firmware volumes 210a-210c/300 that provides the BIOS module that was identified for provisioning (e.g., based on the dependency expressions in the PEIM drivers, DXE drivers, and/or other BIOS modules provided by the firmware volumes 210a-210c as discussed above). The BIOS engine 204 may then perform BIOS module provisioning operations 602 that may include using those retrieved firmware file sections 306 to provide a BIOS module 604 using any of a variety of BIOS module provisioning techniques that would be apparent to one of skill in the art in possession of the present disclosure.

Figure 6B:
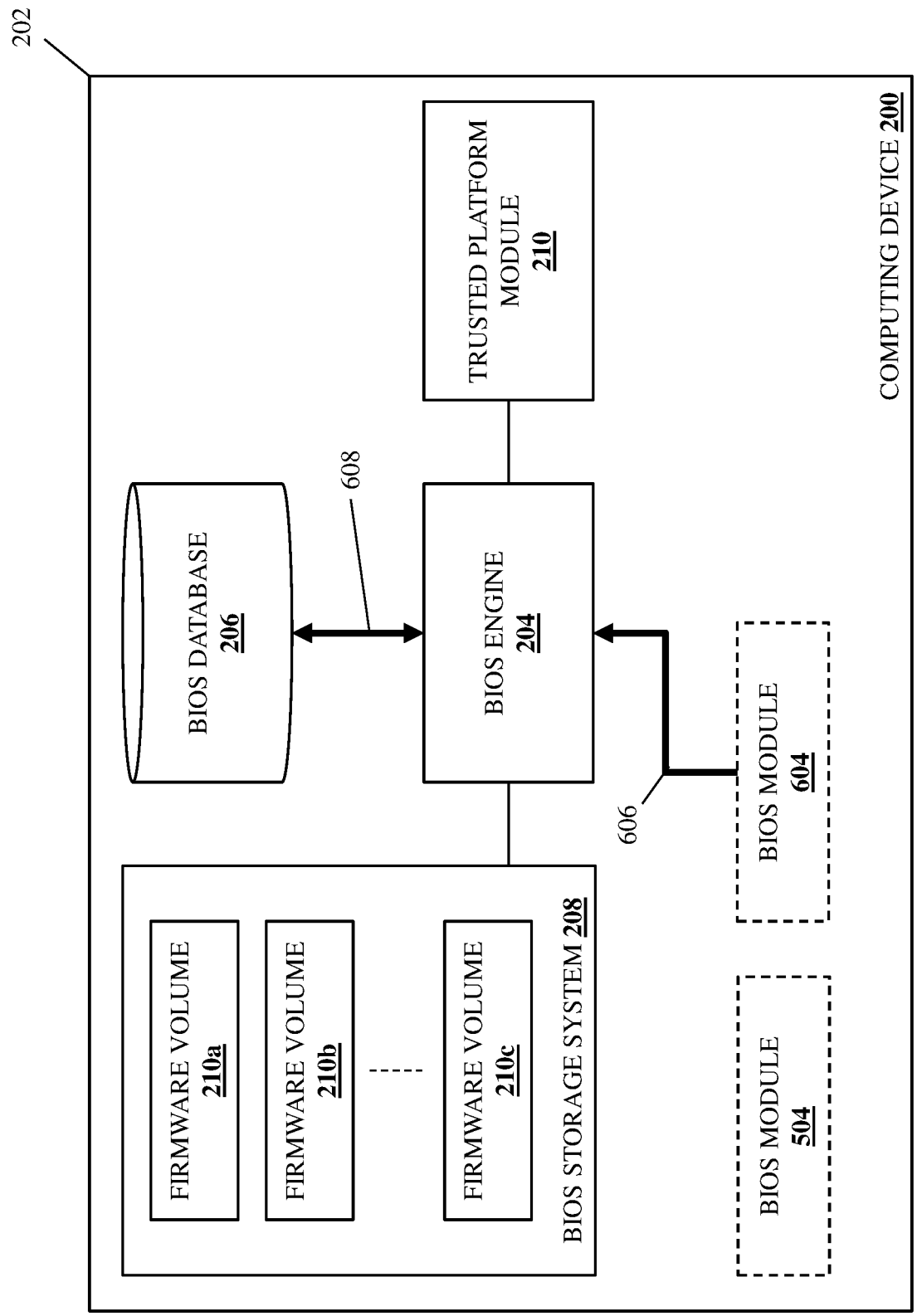
FIG. 6B is a schematic view illustrating an embodiment of the operation of the computing device of FIG. 2 during the method of FIG. 4.

The second iteration of the method 400 then proceeds to block 404 where the BIOS subsystem retrieves a BIOS module identifier associated with the BIOS module. With reference to FIG. 6B, in an embodiment of block 404, the BIOS engine 204 in the computing device 200 may perform BIOS module identifier retrieval operations 606 that may include retrieving the GUID that provides the name 304f in the firmware file header 304 of the firmware file 302 in the firmware volume that was used to provide the BIOS module 604 at block 402. Furthermore, while illustrated and discussed as being retrieved from the BIOS module 604, one of skill in the art in possession of the present disclosure will appreciate how the GUID associated with the BIOS module 604 (i.e., the GUID that provides the name 304f in the firmware file header 304 of the firmware file 302 that was used to provide the BIOS module 604) may be retrieved along with the firmware file sections 306 that are used to provide the BIOS module 604 at the same time from that firmware file 302 (e.g., as part of the BIOS module retrieval operations 600) while remaining within the scope of the present disclosure as well.

The second iteration of the method 400 then proceeds to block 406 where the BIOS subsystem updates BIOS module provisioning sequence information using the BIOS module identifier. With continued reference to FIG. 6B, in an embodiment of block 406, the BIOS engine 204 in the computing device 200 may perform BIOS module provisioning sequence information update operations 608 that include updating BIOS module provisioning sequence information in the BIOS database 206. Furthermore, as will be appreciated by one of skill in the art in possession of the present disclosure, in this second iteration of the method 400 the updating of the BIOS module provisioning sequence information may utilize previously updated BIOS module provisioning sequence information. For example, at block 406, the BIOS engine 204 may concatenate the most recently updated BIOS module provisioning sequence information (e.g., the BIOS module provisioning sequencing information generated during the first iteration of the method 400 described above) with the BIOS module identifier (e.g., the GUID retrieved at block 404 during this second iteration of the method 400), perform a hash operation on that concatenated updated BIOS module provisioning sequence information/BIOS module identifier to generate a hash result, and may then store that hash result in the BIOS database 206. However, while specific examples of the updating of the BIOS module provisioning sequence information of the present disclosure are described herein, one of skill in the art in possession of the present disclosure will appreciate how the BIOS module provisioning sequence information of the present disclosure may be provided in other manners that will fall within the scope of the present disclosure as well.

Figure 7A:
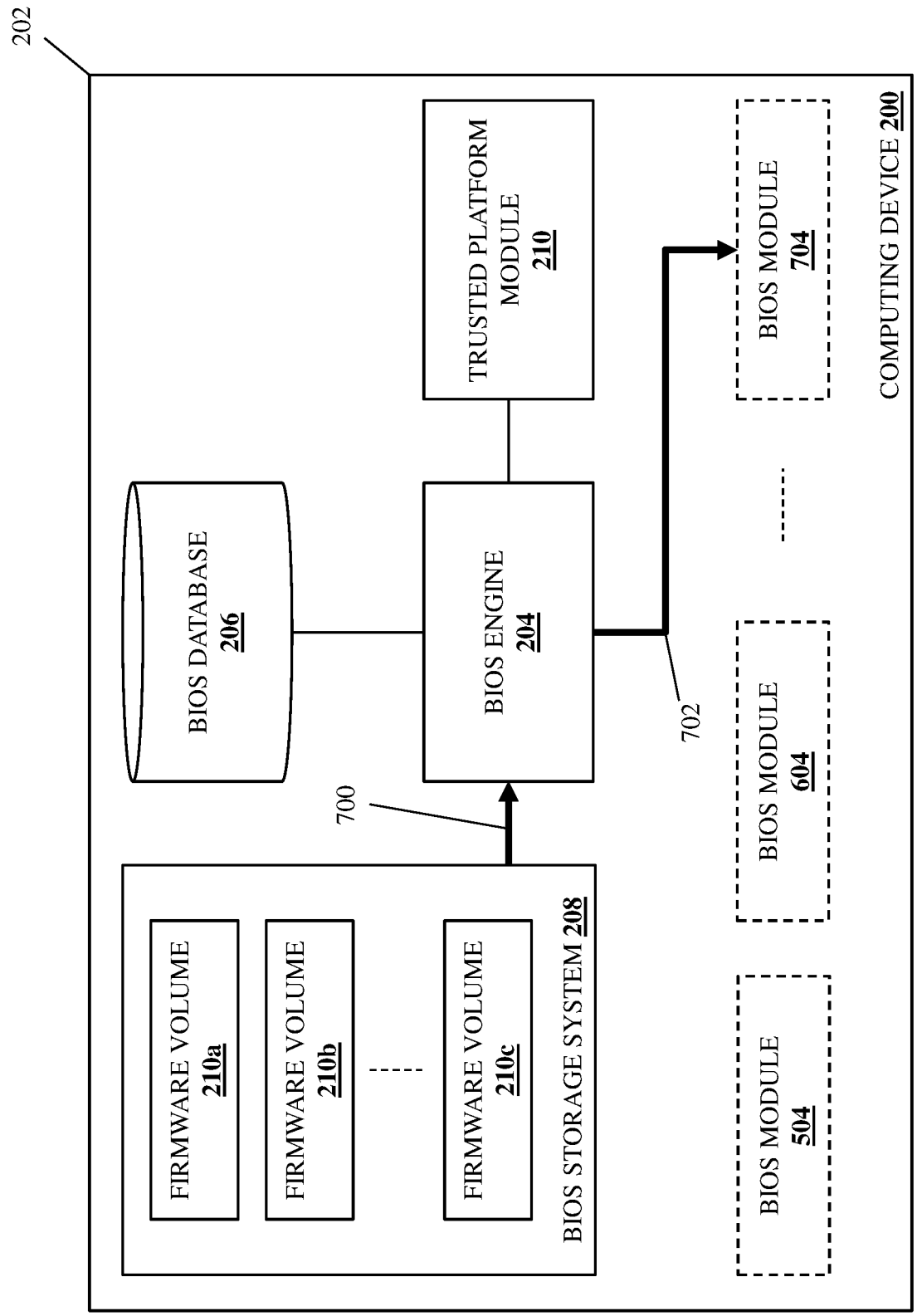
FIG. 7A is a schematic view illustrating an embodiment of the operation of the computing device of FIG. 2 during the method of FIG. 4.

The method 400 then proceeds to decision block 406 where it is again determined whether the BIOS module provisioning sequence is complete in substantially the same manner as described above. As such, the method 400 may continue to loop through blocks 402, 404, 406, and 408 until a last iteration of the method 400 is performed. For example, with reference to FIG. 7A and in an embodiment of block 402 that may be performed during an last iteration of the method 400, the BIOS engine 204 in the computing device may perform BIOS module retrieval operations 700 that may include retrieving firmware file sections 306 from a firmware file 302 in one of the firmware volumes 210a-210c/300 that provides the BIOS module that was identified for provisioning (e.g., based on the dependency expressions in the PEIM drivers, DXE drivers, and/or other BIOS modules provided by the firmware volumes 210a-210c as discussed above). The BIOS engine 204 may then perform BIOS module provisioning operations 702 that may include using those retrieved firmware file sections 306 to provide a BIOS module 704 using any of a variety of BIOS module provisioning techniques that would be apparent to one of skill in the art in possession of the present disclosure.

Figure 7B:
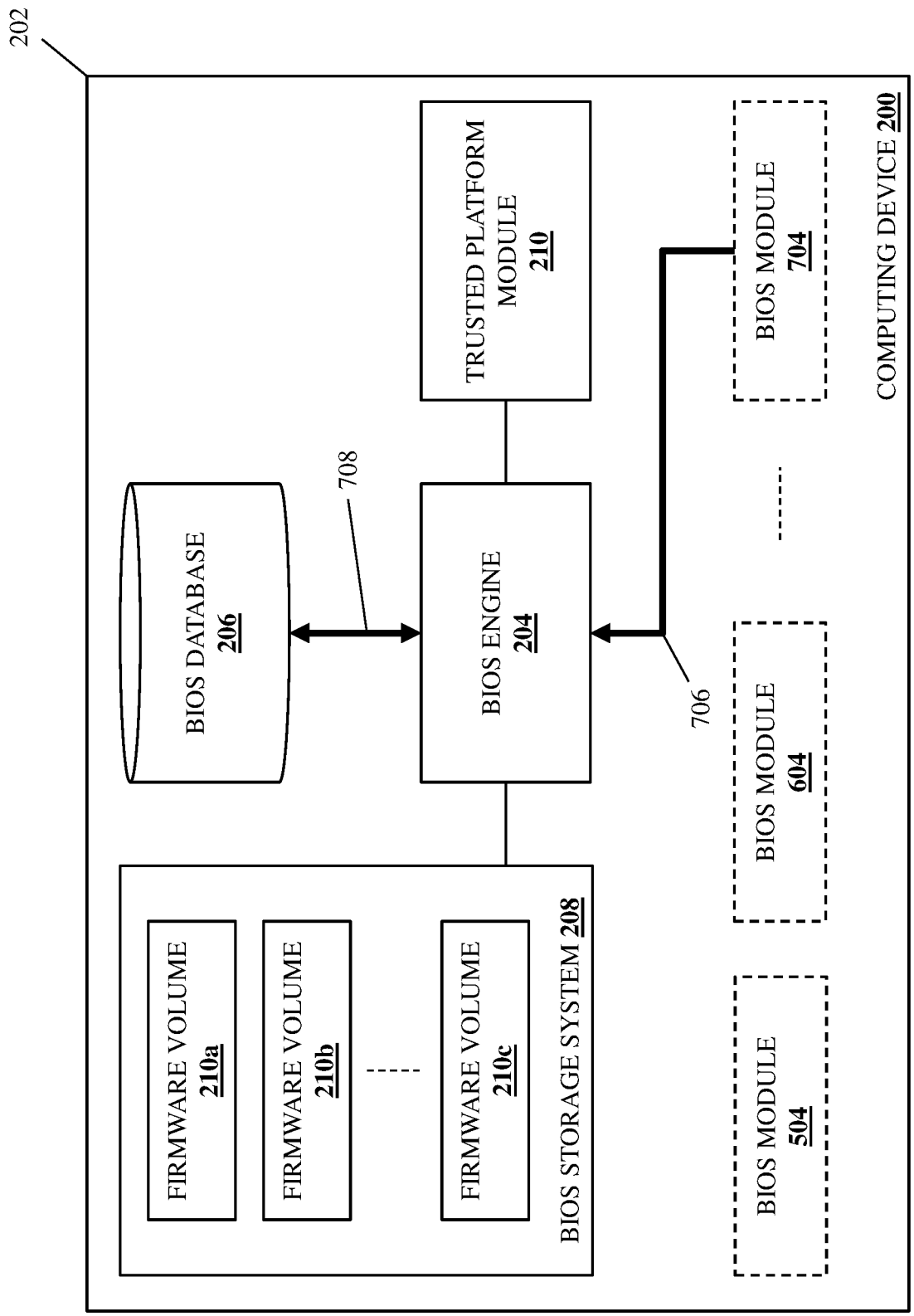
FIG. 7B is a schematic view illustrating an embodiment of the operation of the computing device of FIG. 2 during the method of FIG. 4.

The last iteration of the method 400 then proceeds to block 404 where the BIOS subsystem retrieves a BIOS module identifier associated with the BIOS module. With reference to FIG. 7B, in an embodiment of block 404, the BIOS engine 204 in the computing device 200 may perform BIOS module identifier retrieval operations 706 that may include retrieving the GUID that provides the name 304f in the firmware file header 304 of the firmware file 302 in the firmware volume that was used to provide the BIOS module 704 at block 402. Furthermore, while illustrated and discussed as being retrieved from the BIOS module 704, one of skill in the art in possession of the present disclosure will appreciate how the GUID associated with the BIOS module 704 (i.e., the GUID that provides the name 304f in the firmware file header 304 of the firmware file 302 that was used to provide the BIOS module 704) may be retrieved along with the firmware file sections 306 that are used to provide the BIOS module 504 at the same time from that firmware file 302 (e.g., as part of the BIOS module retrieval operations 700) while remaining within the scope of the present disclosure as well.

The last iteration of the method 400 then proceeds to block 406 where the BIOS subsystem updates BIOS module provisioning sequence information using the BIOS module identifier. With continued reference to FIG. 7B, in an embodiment of block 406, the BIOS engine 204 in the computing device 200 may perform BIOS module provisioning sequence information update operations 708 that include updating BIOS module provisioning sequence information in the BIOS database 206. Furthermore, as will be appreciated by one of skill in the art in possession of the present disclosure, in this last iteration of the method 400, the updating of the BIOS module provisioning sequence information may utilize previously updated BIOS module provisioning sequence information. For example, at block 406, the BIOS engine 204 may concatenate the most recently updated BIOS module provisioning sequence information with the BIOS module identifier (e.g., the GUID retrieved at block 404 during this last iteration of the method 400), perform a hash operation on that concatenated updated BIOS module provisioning sequence information/BIOS module identifier to generate a hash result, and may then store that hash result in the BIOS database 206. However, while specific examples of the updating of the BIOS module provisioning sequence information of the present disclosure are described herein, one of skill in the art in possession of the present disclosure will appreciate how the BIOS module provisioning sequence information of the present disclosure may be provided in other manners that will fall within the scope of the present disclosure as well.

Figure 8:
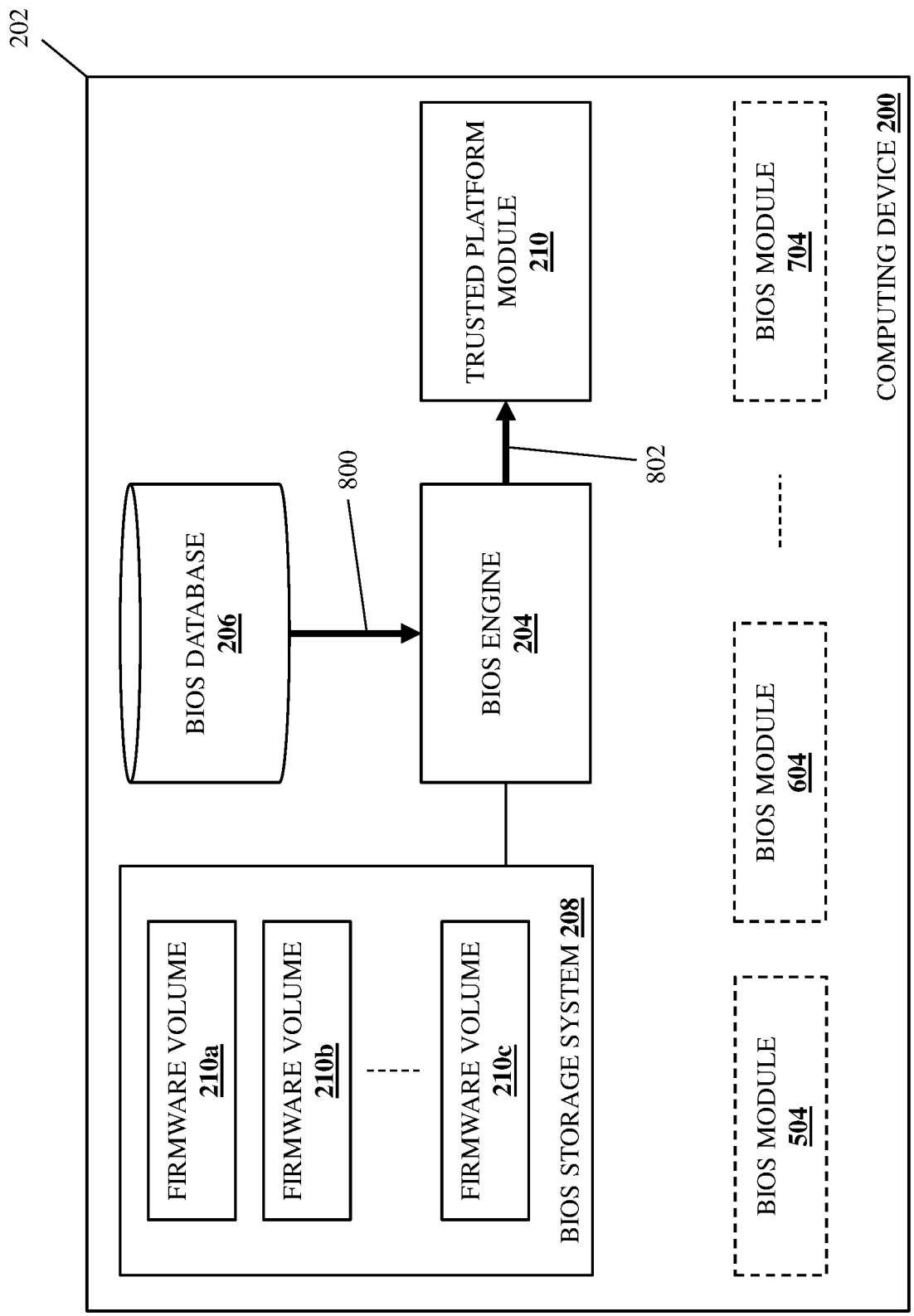
FIG. 8 is a schematic view illustrating an embodiment of the operation of the computing device of FIG. 2 during the method of FIG. 4.

If at decision block 406, it is determined that the BIOS module provisioning sequence is complete, the method 400 proceeds to block 410 where the BIOS subsystem provides the BIOS module provisioning sequence information to a TPM. With reference to FIG. 8, in an embodiment of block 410, the BIOS engine 204 in the computing device 200 may perform BIOS module provisioning sequence information retrieval operations 800 that include retrieving the most recently updated BIOS module provisioning sequence information (e.g., the hash result generated at block 406 during the last iteration of the method 400 as described above). The BIOS engine 204 may then perform BIOS module provisioning sequence information provisioning operations 802 that include providing the BIOS module provisioning sequence information to the TPM 210. For example, at block 410 the BIOS module provisioning sequence information may be provided in the Platform Configuration Register 0 (PCR0) or the Platform Configuration Register 6 (PCR 6) of the TPM 210. As will be appreciated by one of skill in the art in possession of the present disclosure, in some embodiments, at block 410 the BIOS module provisioning sequence information may be used to "extend" information (e.g., a measurement such as the firmware volume hash value discussed above) that is currently stored in a PCR of the TPM 210, although the BIOS module provisioning sequence information may be provided in the TPM 210 in other manners that will fall within the scope of the present disclosure as well.

The method 400 then proceeds to decision block 412 where it is determined whether the BIOS module provisioning sequence information is verified. In an embodiment, at decision block 412 and following the provisioning of all the BIOS modules needed for the initialization/boot process for the computing device 200, the computing device 200 may prepare to enter a runtime state by, for example, having an operating system loading component or other initialization/boot component known in the art compare the BIOS module provisioning sequence information to BIOS module provisioning sequence verification information to determine whether the BIOS module provisioning sequence information is indicative of a verified/expected BIOS module provisioning sequence. For example, desired/"known"/"golden" BIOS module provisioning sequence information (e.g., a desired/"known"/"golden" hash value, a desired/"known"/"golden" extended PCR value, etc.) may have previously been determined and stored in the TPM 210, and may be compared to the updated BIOS module provisioning sequence information (e.g., a hash value, an extended PCR value, etc.) generated at block 406 during the last iteration of the method 400 to determine whether the BIOS modules were provided in a desired/"known"/"golden" BIOS module provisioning sequence.

If, at decision block 412, it is determined that the BIOS module provisioning sequence information is verified, the method 400 proceeds to block 414 wherein a computing device enters a runtime state. In an embodiment, at block 414 and in response to verification of the BIOS module provision sequence information, the computing device 200 may load an operating system and enter a runtime state based on the verification that the BIOS modules were provided in the desired/"known"/"golden" BIOS module provisioning sequence. As will be appreciated by one of skill in the art in possession of the present disclosure, the entering of the runtime state by the computing device 200 at block 414 assumes that the firmware volume verification discussed above was successful, and one of skill in the art in possession of the present disclosure will appreciate how an unsuccessful firmware volume verification may cause the computing device to perform any of a variety of unverified firmware volume operations known in the art (e.g., similarly to the unverified BIOS module provisioning sequence operations discussed below).

If, at decision block 412, it is determined that the BIOS module provisioning sequence information is not verified, the method 400 proceeds to block 416 where the computing device performs an unverified BIOS module provisioning sequence operation. In an embodiment, at block 416 and in response to the BIOS module provision sequence information not being verified, the computing device 200 perform an unverified BIOS module provisioning sequence operation based on the BIOS modules having not been provided in the desired/"known"/"golden" BIOS module provisioning sequence. As will be appreciated by one of skill in the art in possession of the present disclosure, the unverified BIOS module provisioning sequence operation may include generating a warning that that BIOS modules were not provided in the desired/"known"/"golden" BIOS module provisioning sequence and displaying the warning to a user of the computing device 200, shutting down the computing device 200 and preventing the computing device 200 from starting up, and/or any other unverified BIOS module provisioning sequence operations that would be apparent to one of skill in the art in possession of the present disclosure.

Thus, systems and methods have been described that provide for the updating of BIOS module provisioning sequence information that identifies a sequence in which BIOS modules are provided and, upon completion of the provisioning of the BIOS modules, the comparison of the BIOS module provisioning sequence information to BIOS module provisioning sequence verification information. For example, the BIOS module provisioning sequence verification system of the present disclosure may include a BIOS subsystem coupled to a TPM and a BIOS storage system including a plurality of firmware volumes. The BIOS subsystem provides a plurality of BIOS modules in a BIOS module provisioning sequence using the plurality of firmware volumes and, for each of the plurality of BIOS modules when that BIOS module is provided during the BIOS module provisioning sequence: retrieves a BIOS module identifier associated with that BIOS module, and updates BIOS module provisioning sequence information using that BIOS module identifier. Following the provisioning of the BIOS modules in the BIOS module provisioning sequence, the BIOS subsystem provides the BIOS module provisioning sequence information to the TPM, with the BIOS module provisioning sequence information configured to be compared to BIOS module provisioning sequence verification information to verify the BIOS module provisioning sequence. As will be appreciated by one of skill in the art in possession of the present disclosure, the systems and methods of the present disclosure provide for the verification of whether BIOS modules were provided in a known/secure sequence with a negligible impact to the time needed to complete the initialization/boot process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) module provisioning sequence verification system, comprising:
    a Trusted Platform Module (TPM);
    a Basic Input/Output System (BIOS) storage system including a plurality of firmware volumes; and
    a BIOS subsystem that is coupled to the TPM and the BIOS storage system, wherein the BIOS subsystem is configured to:
        provide a plurality of BIOS modules in a BIOS module provisioning sequence using the plurality of firmware volumes and, for each of the plurality of BIOS modules when that BIOS module is provided during the BIOS module provisioning sequence:
            retrieve a BIOS module identifier associated with that BIOS module; and
            update BIOS module provisioning sequence information using that BIOS module identifier; and
        provide, following the provisioning of the BIOS modules in the BIOS module provisioning sequence, the BIOS module provisioning sequence information to the TPM, wherein the BIOS module provisioning sequence information is configured to be compared to BIOS module provisioning sequence verification information to verify the BIOS module provisioning sequence.

2. The system of claim 1, wherein the updating the BIOS module provisioning sequence information for each of the plurality of BIOS modules using the BIOS module identifier for that BIOS module when that BIOS module is provided during the BIOS module provisioning sequence includes:
    performing a hash operation using the BIOS module identifier for that BIOS module.

3. The system of claim 2, wherein the hash operation is performed using the BIOS module identifier for that BIOS module and the BIOS module provisioning sequence information that was most recently updated during the BIOS module provisioning sequence.

4. The system of claim 1, wherein the BIOS module identifier for each BIOS module includes a Globally Unique IDentifier (GUID) in a firmware file header of a firmware file in one of the firmware volumes that was used to provide that BIOS module.

5. The system of claim 1, wherein the BIOS module provisioning sequence information is provided in one of a Platform Configuration Register 0 (PCR0) or a Platform Configuration Register 6 (PCR6) in the TPM.

6. The system of claim 1, wherein BIOS modules are provided by at least one of Pre-Extensible Firmware Interface (EFI) Initialization Module (PEIM) drivers and Driver execution Environment (DXE) drivers.

7. An Information Handling System (IHS), comprising:
a processing system; and
a memory system that is coupled to the processing system and that includes instructions that, when executed by the processing system, cause the processing system to provide a Basic Input/Output System (BIOS) engine that is configured to:
provide a plurality of BIOS modules in a BIOS module provisioning sequence using a plurality of firmware volumes included in a BIOS storage system and, for each of the plurality of BIOS modules when that BIOS module is provided during the BIOS module provisioning sequence:
retrieve a BIOS module identifier associated with that BIOS module; and
update BIOS module provisioning sequence information using that BIOS module identifier; and
provide, following the provisioning of the BIOS modules in the BIOS module provisioning sequence, the BIOS module provisioning sequence information to a Trusted Platform Module (TPM), wherein the BIOS module provisioning sequence information is configured to be compared to BIOS module provisioning sequence verification information to verify the BIOS module provisioning sequence.

8. The IHS of claim 7, wherein the updating the BIOS module provisioning sequence information for each of the plurality of BIOS modules using the BIOS module identifier for that BIOS module when that BIOS module is provided during the BIOS module provisioning sequence includes:
performing a hash operation using the BIOS module identifier for that BIOS module.

9. The IHS of claim 8, wherein the hash operation is performed using the BIOS module identifier for that BIOS module and the BIOS module provisioning sequence information that was most recently updated during the BIOS module provisioning sequence.

10. The IHS of claim 7, wherein the BIOS module identifier for each BIOS module includes a Globally Unique IDentifier (GUID) in a firmware file header of a firmware file in one of the firmware volumes that was used to provide that BIOS module.

11. The IHS of claim 7, wherein the BIOS module provisioning sequence information is provided in one of a Platform Configuration Register 0 (PCR0) or a Platform Configuration Register 6 (PCR6) in the TPM.

12. The IHS of claim 7, wherein BIOS modules are provided by at least one of Pre-Extensible Firmware Interface (EFI) Initialization Module (PEIM) drivers and Driver eXecution Environment (DXE) drivers.

13. The IHS of claim 7, wherein the BIOS storage system includes a BIOS Serial Peripheral Interface (SPI) Read-Only Memory (ROM).

14. A method for verifying a provisioning sequence of Basic Input/Output System (BIOS) modules, comprising:
providing, by a Basic Input/Output System (BIOS) subsystem, a plurality of BIOS modules in a BIOS module provisioning sequence using a plurality of firmware volumes included in a BIOS storage system and, for each of the plurality of BIOS modules when that BIOS module is provided during the BIOS module provisioning sequence:
retrieving a BIOS module identifier associated with that BIOS module; and
updating BIOS module provisioning sequence information using that BIOS module identifier; and
providing, by the BIOS subsystem following the provisioning of the BIOS modules in the BIOS module provisioning sequence, the BIOS module provisioning sequence information to a Trusted Platform Module (TPM), wherein the BIOS module provisioning sequence information is configured to be compared to BIOS module provisioning sequence verification information to verify the BIOS module provisioning sequence.

15. The method of claim 14, wherein the updating the BIOS module provisioning sequence information for each of the plurality of BIOS modules using the BIOS module identifier for that BIOS module when that BIOS module is provided during the BIOS module provisioning sequence includes:
performing a hash operation using the BIOS module identifier for that BIOS module.

16. The method of claim 15, wherein the hash operation is performed using the BIOS module identifier for that BIOS module and the BIOS module provisioning sequence information that was most recently updated during the BIOS module provisioning sequence.

17. The method of claim 14, wherein the BIOS module identifier for each BIOS module includes a Globally Unique IDentifier (GUID) in a firmware file header of a firmware file in one of the firmware volumes that was used to provide that BIOS module.

18. The method of claim 14, wherein the BIOS module provisioning sequence information is provided in one of a Platform Configuration Register 0 (PCR0) or a Platform Configuration Register 6 (PCR6) in the TPM.

19. The method of claim 14, wherein BIOS modules are provided by at least one of Pre-Extensible Firmware Interface (EFI) Initialization Module (PEIM) drivers and Driver execution Environment (DXE) drivers.

20. The method of claim 14, wherein the BIOS storage system includes a BIOS Serial Peripheral Interface (SPI) Read-Only Memory (ROM).

* * * * *